(No Model.)
T. J. MAYALL.
FLOOR COVERING.
No. 286,043. Patented Oct. 2, 1883.
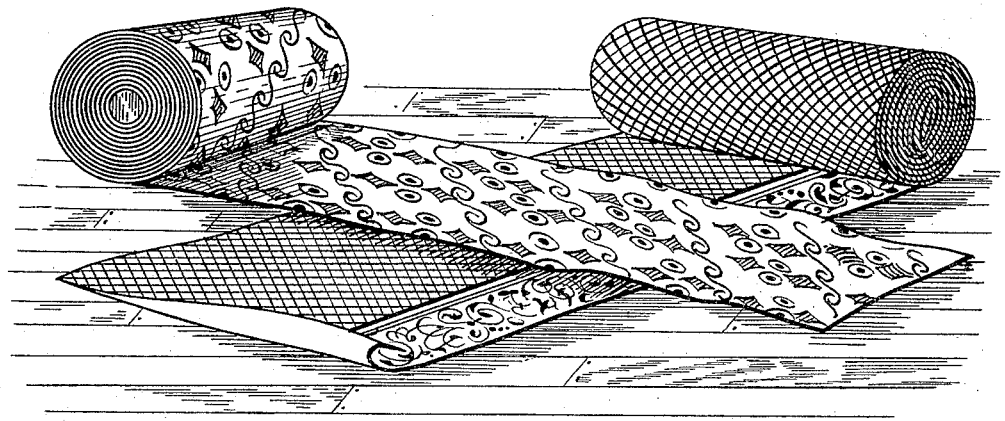
Fig. 1.
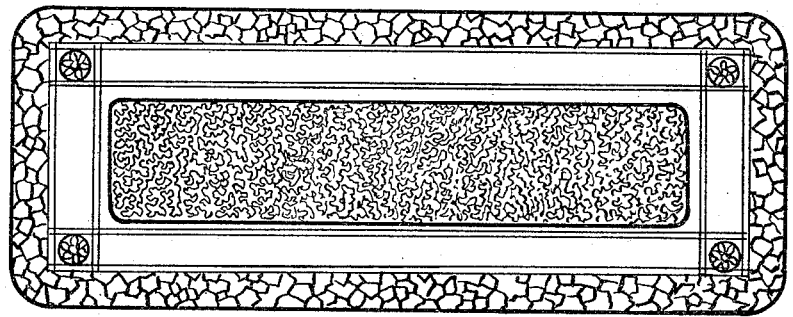
Fig. 2.
Fig. 3.                     Fig. 4.
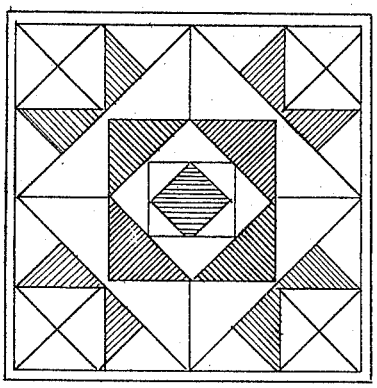        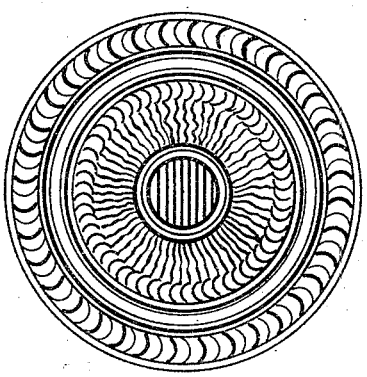
Fig. 5.                     Fig. 6.
Witnesses
Ch. Houghton
Geo. D. Lawson
Inventor
Tho. J. Mayall

UNITED STATES PATENT OFFICE.

THOMAS J. MAYALL, OF READING, ASSIGNOR TO THE BRUNSWICK ANTIMONY COMPANY, OF BOSTON, MASSACHUSETTS.

FLOOR-COVERING.

SPECIFICATION forming part of Letters Patent No. 286,043, dated October 2, 1883.

Application filed March 19, 1883. (No model.)

*To all whom it may concern:*

Be it known that I, THOMAS J. MAYALL, of Reading, in the county of Middlesex and Commonwealth of Massachusetts, have invented a new and useful Floor-Covering, of which the following is a specification.

My invention relates to a floor-covering made wholly or partly of rubber, or rubber and cloth, the object of it being to produce a floor-covering with various colors in the substance of it imbedded in different patterns and designs following, or similar to the arrangement of colors and designs in a wool carpet; and it consists in making a floor-covering or carpet of rubber of the various colors required to complete the pattern or design prepared and put together in the manner hereinafter described.

To practice my invention I thoroughly grind together about equal parts by weight of pure rubber and penta-sulphide or golden sulphuret of antimony, thereby producing a plastic mass which is then run out into thin sheets. By the use of solutions of various metallic salts in precipitating the sulphide of antimony the amorphous penta-sulphide is obtained of nearly if not quite all the primary colors and shades thereof. To make the different colors of rubber compound required for the various patterns, figures, and designs to be embodied in a floor-cloth I grind and compound rubber with as many different colors of the amorphous penta-sulphide of antimony as may be required, each color by itself, and run the plastic mass into thin sheets for use. Upon a piece of strong linen, cotton, or other suitable fabric I first put on a thin coating of fluid-rubber cement, which I call "Mayall's cement," and then lay over the whole surface a thin sheet of the plastic rubber prepared as above described, having the color desired for the "ground color" of the floor-covering or carpet. I then cut out from thin sheets of plastic rubber of the color, or, if more than one color is required, of the various colors necessary to make up the pattern, figure, or design of the carpet to be made, pieces of the required form and dimensions to make up when laid on the sheet of ground color, the pattern, figure, and design of the carpet. The overlaid figures of colored rubber are then pressed down upon and into the sheet of ground color rubber by passing between pressure-rolls, or in any other suitable manner while warm, so as to weld the whole into one homogeneous mass. If it is desired to corrugate or in any form emboss an irregular or regular surface upon the carpet, it may then be passed under a pressure-roll having upon its surface the irregular or regular form to be embossed upon the carpet. The rubber is then cured or vulcanized, which may be done in the usual way of curing soft-rubber goods. Before putting the carpet in the curing-oven I cover the surface with powdered talc, or some similar substance, to prevent different parts of it from adhering together and roll it up loosely in bolts of convenient size to handle. Floor-coverings or carpets may be made in this way of any size from a small rug to a covering for a large room.

With skill and care the colors can be so laid that the finished carpet will have the appearance of a wool carpet. The colors will not fade or wear off, as the pressure to which they are submitted drives them nearly through the body of the rubber sheet of the ground color. They can always be kept fresh and clean as when new by washing, and do not require varnishing.

A floor-covering or carpet may be made in this manner above described without the cloth backing, if desirable; but in such case it would be advisable to increase the thickness of the ground color sheet of rubber.

In the drawings annexed, Figure 1 shows sample rolls or batts of the improved floor-covering and top view of a small portion unrolled. Fig. 2 shows a top view of a mat or rug of the improved floor-covering. Figs. 3 and 4 show a cross-section of the floor-covering having the upper surface corrugated. Figs. 5 and 6 show top views of mats or rugs of the improved floor-covering.

I do not claim, broadly, floor-cloth or carpet made of rubber, or rubber and cloth combined, such having been made before; but I do claim as new and of my invention—

1. The above-described improved floor-covering, consisting of rubber compounded of various colors and cloth made in the manner or substantially as set forth.

2. The above-described improved floor-cloth made of rubber compound of various colors without cloth-backing.

3. A floor covering made of a compound of rubber and golden sulphuret of antimony compounded and cured, substantially as set forth.

THOS. J. MAYALL.

Witnesses:
 CHS. HOUGHTON,
 GRIDLEY I. J. BRYANT.